No. 694,351. Patented Mar. 4, 1902.
C. C. CHAPPEL.
PLOW COLTER FASTENING DEVICE.
(Application filed Nov. 19, 1901.)
(No Model.)

Witnesses. Inventor:

UNITED STATES PATENT OFFICE.

CHRISTOPHER C. CHAPPEL, OF BONO, ARKANSAS.

PLOW-COLTER-FASTENING DEVICE.

SPECIFICATION forming part of Letters Patent No. 694,351, dated March 4, 1902.

Application filed November 19, 1901. Serial No. 82,892. (No model.)

*To all whom it may concern:*

Be it known that I, CHRISTOPHER C. CHAPPEL, a citizen of the United States, residing at Bono, in the county of Craighead and State of Arkansas, have invented certain new and useful Improvements in Plow-Colter-Fastening Devices, of which the following is a specification, reference being had therein to the accompanying drawings.

My invention has for its object to provide convenient devices for adjustably securing a plow-colter in any desired position on the plow-beam in such a manner that without the use of a hammer or wrench the holding devices for the colter can be released, so that the colter may be raised or lowered on the plow-beam and then secured in any desired position of adjustment quickly and conveniently, the adjustable holding devices being of such a character that the inclination of the colter may be varied, so as to move its acting portion nearer to or farther from the point of the plow.

Figure 1:
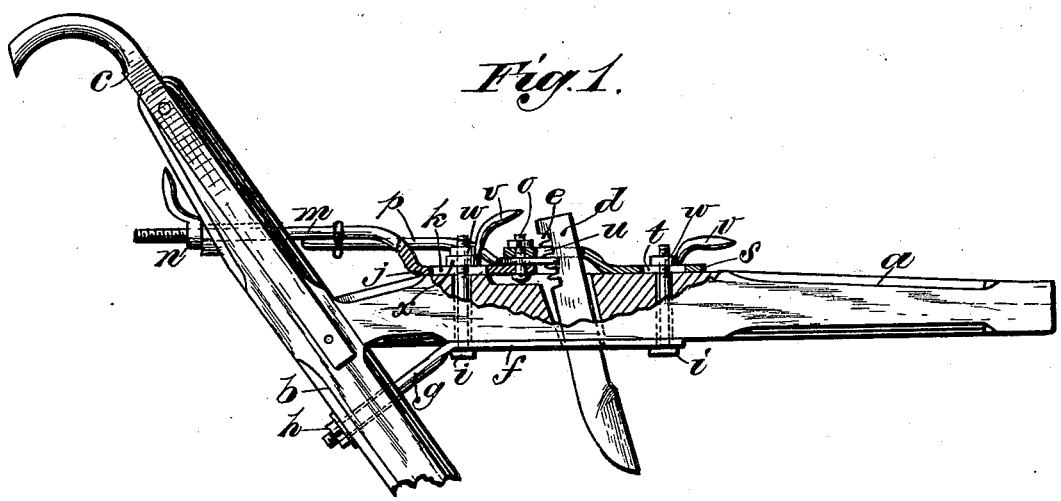
Figure 2:
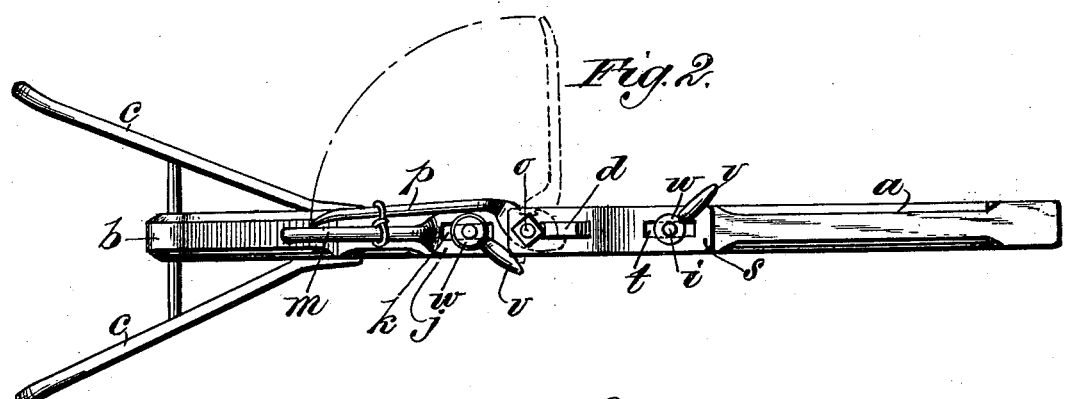
Figure 3:

In the accompanying drawings, Figure 1 is a side view, partly in section, of a plow-beam and standard with the invention applied thereto. Fig. 2 is a plan view of the same. Fig. 3 is a detail view of the colter-fastening lever.

Referring to the drawings, $a$ denotes the plow-beam and $b$ the standard thereof, the latter being provided with the usual handles $c$. The plow-beam is mortised for the reception of the colter $d$, the rear face of the shank of which is provided with a series of notches $e$. Secured to the lower face of the plow-beam by bolts $i$, passing through holes in said plow-beam, is a plate $f$, having a shank $g$ passing through the lower portion of the standard $b$ and screw-threaded for the reception of a nut $h$, the said plate having a slot through which the shank of the colter passes with sufficient looseness to permit the colter to swing back and forth horizontally in the direction of the length of the plow-beam as the acting lower portion of the colter is adjusted to bring it nearer to or farther from the point of the plow. The plow and moldboard may be of any desired construction; but as these parts form no part of the present invention they have been omitted from the drawings for simplicity of illustration.

Mounted on the upper side of the plow-beam is a plate $j$, provided with a slot $k$, through which one of the bolts $i$ loosely passes, said plate having a shank $m$ extending through the upper portion of the standard $b$ and screw-threaded at its rear end for the reception of a handled nut $n$.

Pivoted to a bolt $o$, attached to the forward end of the plate $j$, is a lever $p$, having a cam portion or tooth $q$, adapted to engage any one of the notches $e$ in the rear face of the colter when the said lever is in the holding position, (denoted in full lines in Fig. 2,) so as to hold the colter in working position; but when the said lever is swung sidewise, as denoted in dotted lines in Fig. 2, the cam portion or tooth $q$ will be removed from the colter, leaving the latter free to be adjusted up or down, as may be desired. A small projection $r$ at the extreme end of the colter-fastening lever comes into contact with the side of the colter when said lever is moved to its fastening position, so that said projection serves as a stop to limit the movement of the said lever in securing the colter in place. On the upper face of the plow-beam is a second plate $s$, provided with slots $t$ and $u$, through the former of which one of the bolts $i$ loosely passes and through the latter of which the colter extends, the said plate $s$ being connected with the plate $j$ by the bolt $o$.

The bolts $i$ are both provided with nuts $w$, having handles $v$, by which they may be conveniently turned for the purpose of loosening the plates $j$ and $s$ when the said plates are to be moved longitudinally of the plow-beam by the handled nut $n$ or otherwise for the purpose of varying the inclination of the colter to adjust the working lower portion thereof nearer to or farther from the point of the plow. The rear bolt $i$ has a washer $x$ interposed between the plate $j$ and the handled nut of the said bolt, said washer serving to raise the said nut to the proper height to allow its handle to be conveniently turned without interfering with the shank $m$ of the plate $j$.

From the foregoing it will be understood that when it is desired to adjust the colter up and down it is only necessary to swing the fastening-lever $p$ to the position shown in dotted lines in Fig. 2, and when the desired adjustment has been made the said colter is again quickly secured in place by swinging the said lever back to the position shown in full lines in Fig. 2. Also, if it be desired to vary the inclination of the colter, to bring its acting portion nearer to or farther from the point of the plow it is only necessary to loosen the handled nuts $w$ to release the connected plates $j$ and $s$, leaving the same free to be moved longitudinally of the plow-beam by the handled nut $n$ or otherwise.

Having thus described my invention, I claim and desire to secure by Letters Patent—

1. In a plow, the combination with a colter provided with a series of holding-notches, of a vertically-pivoted and horizontally-swinging fastening-lever having a portion adapted to engage any one of said notches to hold the colter in place and which lever may be swung aside when it is desired to release the colter to permit the same to be adjusted vertically in the plow-beam.

2. In a plow, the combination with the beam thereof, of a colter mounted loosely on said beam so as to be capable of being swung back and forth longitudinally of the beam, more or less, two connected longitudinally-adjustable plates provided with slots, bolts passing loosely through said slots and provided with handled nuts adapted to be turned without the use of a wrench when it is desired to loosen the said plates for the purpose of moving them lengthwise of the plow-beam to adjust the working part of the colter nearer to or farther from the point of the plow.

3. In a plow, the combination with the beam thereof, of a colter passing loosely through said beam and the shank of which is provided with a series of holding-notches, the connected slotted plates $j$ and $s$, bolts passing through the slots of said plates, handled nuts on said bolts, and the colter-fastening lever $p$ provided with a tooth or cam portion adapted to engage any one of the said notches in the shank of said colter, to hold the colter in place, but capable of being swung aside sidewise to release the colter when the latter is to be moved up and down in the plow-beam.

In testimony whereof I affix my signature in presence of two witnesses.

CHRISTOPHER C. CHAPPEL.

Witnesses:
G. W. CULBERHOUSE,
H. C. THORNTON.